United States Patent [19]

Schwarb et al.

[11] Patent Number: 4,969,940
[45] Date of Patent: Nov. 13, 1990

[54] APPARATUS AND METHOD FOR MAKING MINERAL WOOL FROM COAL-ASH

[76] Inventors: Charles H. Schwarb, 1365 Turttle Creek La., Lake Orion, Mich. 48035; Raymond E. Schwarb, 4174 Walnut Hill, Troy, Mich. 48098; T. Kevin Schwarb, 6552 Orion, Rochester Hills, Mich. 48064

[21] Appl. No.: 461,228

[22] Filed: Jan. 5, 1990

[51] Int. Cl.⁵ ............................................. C03B 37/04
[52] U.S. Cl. .............................................. 65/8; 65/15; 65/28; 65/99.2; 65/134; 65/136; 65/DIG. 4; 65/347; 373/27
[58] Field of Search ...................... 65/134, 99.2, 8, 15, 65/136, DIG. 4, 347, 28, 27, 2; 373/27, 71, 72, 79, 81, 84

[56] References Cited

U.S. PATENT DOCUMENTS

| | | |
|---|---|---|
| 2,300,930 | 11/1942 | Johnson . |
| 3,499,743 | 3/1970 | Fanica et al. ................. 65/347 X |
| 3,626,072 | 12/1971 | Haralampiev et al. ........... 373/79 X |
| 4,079,185 | 3/1978 | Collin ............................ 373/81 |
| 4,098,603 | 7/1978 | Roth et al. ................... 373/81 X |
| 4,650,510 | 3/1987 | Tuovinen ..................... 65/19 X |

OTHER PUBLICATIONS

Power: "Convert Ash to Insulation?", Mar. 1978, p. 141.
Detroit Edison Co. Internal Memo dated 9/11/80, 8 pages, Title: "Mineral Wool Spun Fibers from Coal Ash".

Primary Examiner—Robert L. Lindsay
Attorney, Agent, or Firm—Peter D. Keefe

[57] ABSTRACT

An apparatus and method which provides for controlled melting of both components of coal-ash, as well as the melting of selected additives, the melted coal-ash with additive being immediately available to a conventional fiberizing spinner stage. An arc furnace provides a shallow vat for molten pig iron. A first chute allows for introduction of coal-ash into the vat, and a second chute allows for the introduction of selected additives into the vat. The molten pig iron quickly melts any coal-ash and additive entering the vat, and the molten coal-ash/additive thereupon spreads out across the surface of the molten pig iron (the molten pig iron having a much higher specific gravity). In order to ensure that the molten coal-ash/additive has a predetermined fluidity at an adjacent spinner stage, the furnace is provided with a specially structured spout located above the spinner stage. The spout provides a weir to skim melted coal-ash and additive, a dam to block unmelted coal-ash/additive, and a heat reservoir for heating the melted coal-ash/additive.

17 Claims, 2 Drawing Sheets

4,969,940

APPARATUS AND METHOD FOR MAKING MINERAL WOOL FROM COAL-ASH

BACKGROUND OF THE INVENTION

1. Field of the Invention:

This invention relates to an apparatus for producing mineral wool type products from coal-ash, and particularly from the fly-ash component thereof.

2. Description of the Prior Art:

Mineral wool has become increasingly utilized for both thermal and accoustical insulation products. This is because mineral wool (or rock wool) fiber products compete favorably with other products in terms of durability, insulative quality, and cost.

Mineral wool is composed of interlaced fine mineral fibers which have the appearance of wool. Mineral wool is composed principally of silicates of calcium and alumina, along with other minor constituents, which are derived from common shale, clay, calcareous and siliceous materials, including metallurgical slags. Some of the foregoing materials require the addition of fluxes to produce suitable quality mineral wools. These fluxes include limestone, dolomite and fluorspar.

The conventional apparatus and method for making mineral wool is as follows. Lumps of raw material are mixed with coke (as fuel) inside a water jacketed, vertical cupola furnace. The coke is ignited and the heat produced is intensified by a supply of pre-heated combustion air fed into the cupola through a number of tuyeres situated in the lower portion of the furnace. As the coke burns, the raw material forms into a molten mass which flows in a continuous stream toward the bottom of the cupola. The stream of molten raw material then exits the cupola at a tap where it is subjected to spinning and blasting by high pressure air. The spinning/blasting step causes the molten raw material to solidify in long, fine strands. At the conclusion of the process, a mass of interlaced, wool-like mineral fibers has been produced.

Since the 1960's, research has been conducted concerning the production of mineral wool from coal-ash. Coal-ash is a by-product of coal fired furnaces and boilers. The coal-ash is produced by industry in very large quantities, posing a significant disposal problem. There are two components of coal-ash: "bottom-ash", often referred to as wet bottom boiler slag, and "fly-ash". Bottom-ash is generally dumped in disposal pits or reprocessed to serve as an additive for road construction materials. Fly-ash, on the other hand, is very powdery and therefore not safe for pit dumping because of wind-blown dust problems, is not a good additive for construction products (as the products tend to be weakened), and is not susceptible to being made into mineral wool products according to conventional systems.

Problematically, coal-ash is not suitable for melting in a cupola furnace for purposes of mineral wool manufacture because of its inherent powdery nature, which makes furnace operations susceptible to the danger of explosion. Further, coal-ash is not electrically conductive, and so is not susceptible for use in an electric arc furnace. There have been attempts in the prior art to directly transfer hot coal ash from the furnace in which it is being produced to a spinner stage so as to produce fibers. However, this process is impractical, as it is questionable whether the coal-ash is molten coming out of the furnace and, in any event, because of inevitable cool-down that will take place between the furnace location and the spinner stage location, resulting in fibers of dubious quality.

Other types of furnaces have proven unusable as well. In one known attempt by others to provide molten coal-ash for a spinner apparatus using an induction furnace, an explosion resulted due to the agitated molten metal eating into the water jacket of the furnace.

Accordingly, what is needed is an apparatus which will allow for the production of high quality mineral wool fibers from coal-ash.

SUMMARY OF THE INVENTION

The present invention is an apparatus and method which provides for controlled melting of both components of coal-ash, as well as the melting of selected additives, the melted coal-ash with additive being immediately available to a conventional fiberizing spinner stage.

The present invention utilizes an arc furnace, preferably having three spaced apart carbon electrodes. A shallow vat of molten iron is maintained in the furnace by action of the electrodes. A first chute allows for introduction of coal-ash into the vat, and a second chute allows for the introduction of selected additives into the vat. The molten metal quickly melts any coal-ash and additive entering the vat, and the molten coal-ash/additive thereupon spreads out across the surface of the molten iron (the molten iron having a much higher specific gravity). In order to ensure that the molten coal-ash/additive has a predetermined fluidity at an adjacent spinner stage, the furnace is provided with a specially structured spout located above the spinner stage. More particularly, the spout serves as both a weir and dam, allowing only the molten coal-ash and additive to exit the furnace. Further, the spout includes a deepened section adjacent the vat which allows for molten iron to enter into this section of the spout and thereby provide heating for coal-ash and additive entering the spout. Thus, the best melt temperature of the molten coal-ash and additive for the adjacent spinner stage is assured at the spout by the presence of molten iron at least partly within the spout.

Accordingly, it is an object of the present invention to provide a safe and efficient apparatus for melting coal-ash.

It is an additional object of the present invention to provide an electric furnace apparatus which provides for coal-ash and any desired additive to be melted in safety.

It is another object of the present invention to provide an electric furnace apparatus which provides for melting of coal-ash and selected additives and further provides a spout which assures controlled fluidity of the molten coal-ash and additives.

It is still an additional object of the invention to provide an electric furnace which can safely melt coal-ash and selected additives, in which a vat of molten metal that is heated by the furnace supplies melting energy to the coal-ash and the additives.

It is yet a further object of the present invention to provide a method for safely melting coal-ash and selected additives in an electric furnace.

DETAILED DESCRIPTION OF THE PREFERRED EMBODIMENT

Figure 1:
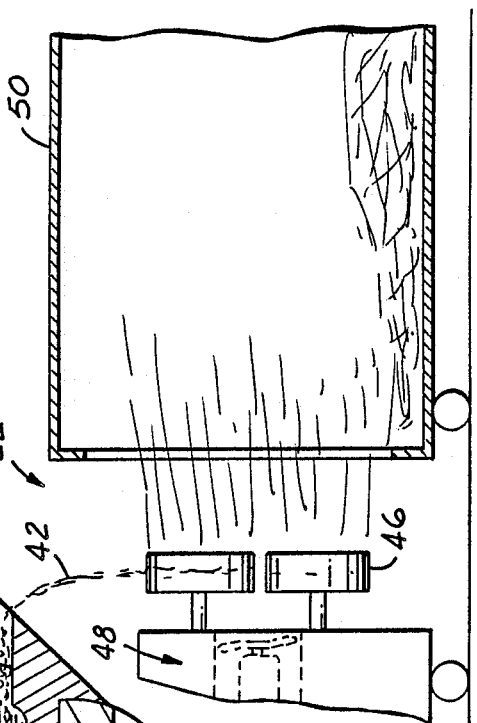
FIG. 1 is a part sectional side view of the electric furnace apparatus according to the present invention, shown in operation with a conventional fiberizing spinner stage.
Figure 2:
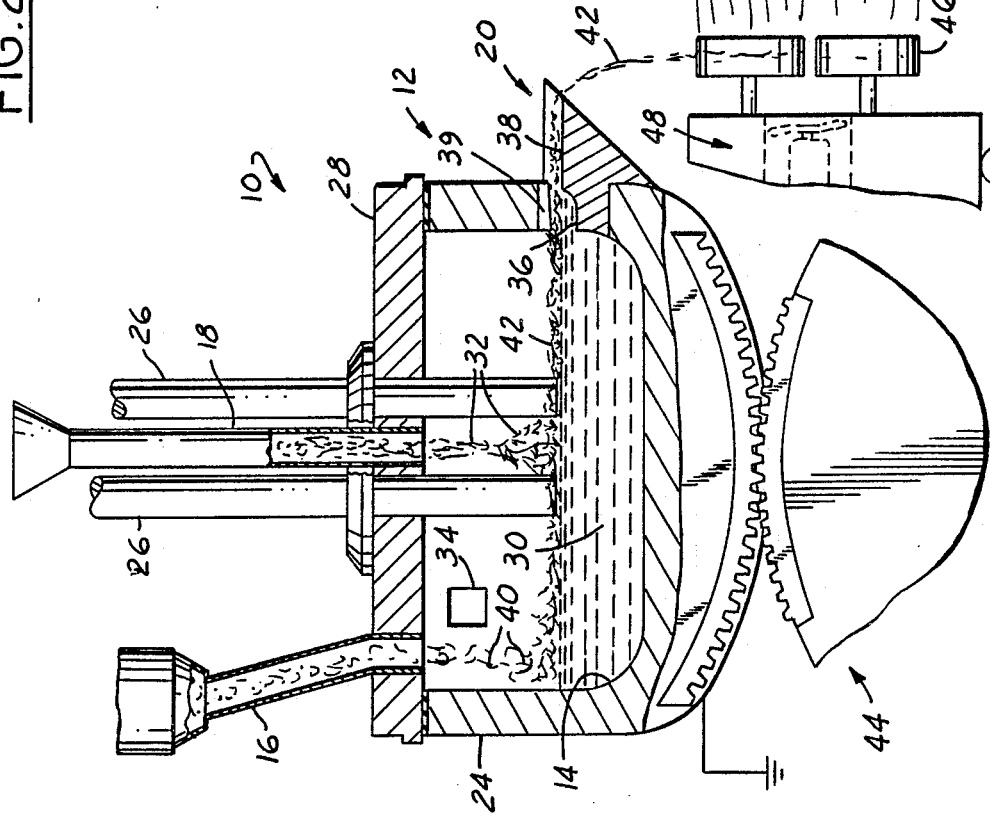
FIG. 2 is a part cut-away plan view of the furnace apparatus as shown in FIG. 1, the cut-away showing the spout according to the present invention.

Referring now to the Drawing, FIGS. 1 and 2 show the apparatus 10 for making fibers from coal-ash. Generally, the apparatus 10 is composed of a furnace 12, a vat 14 containing molten metal within the furnace, a coal-ash chute 16 for introducing coal-ash into the vat, an additive chute 18 for introducing additives into the vat, and a specially configured spout 20 for drawing off molten coal-ash/additive from the vat and to a fiberizing spinner stage 22.

The furnace 12 is preferred to be a direct arc furnace, of the type used conventionally to melt steel, which has been modified according to the present invention for melting coal-ash. The furnace 12 has walls 24 composed of an outer steel shell and an inner refractory lining. Three carbon electrodes 26 enter into the interior of the furnace through the upper portion 28 thereof, the carbon electrodes being mutually spaced apart in a delta shape. Metal 30, preferably pig iron, is located in a vat 14 at the lower portion of the interior of the furnace 10. The metal may selectively enter the furnace though a port 34 in the walls 24. Electrical current sent through the carbon electrodes 26 causes heat to be delivered to the metal 30, resulting in its liquefaction, the state in which the metal 30 is shown in FIG. 1. The metal reaches a predetermined height in the vat 14 and below the port 34 based upon the location of the spout 20.

The spout 20 is configured to permit any liquids floating above the metal 30 to be drawn off by gravitational flow out of the furnace 12, but will not permit the metal to flow out of the furnace. The spout 20 includes three major components, a deepened section 36 a pour spout section 38 and a dam 39. The deepened section 36 is sufficiently deep so that metal 30 enters thereinto, the pour spout section 38 is sufficiently high so that the metal cannot exit thereout, and the dam 39 is located relative to the pour spout section so that only melted coal-ash with its additives can exit via the pour spout section. The deepened section 36 is preferred to be constructed of carbon, as it is in contact with molten metal.

The coal-ash chute 16 is located in the furnace remote from the spout 20. Solid pieces of coal-ash 40 in the form of chunks or powder enter the vat 14 through the coal-ash chute 16 at a predetermined rate. As coal-ash 40 enters the vat, it contacts the metal 30, which, because of its molten state, transfers heat to the solid coal-ash causing it to melt, as well. The coal-ash has a lower specific gravity than the metal 30, so that the liquefied coal-ash floats above the metal in a spread-out pattern across the entire surface of the metal. Importantly, the coal-ash 40 enters the furnace and is thereupon caused to melt by contact with the molten metal 30 without dangerously powderizing in an otherwise potentially explosive manner or simply being blown out as would happen in a Cupola. Indeed, the direct arc furnace is structured so as to use a shallow vat 14 for containing the liquefied metal 30. Accordingly, only a small amount of metal 30 is involved in the melting of the coal-ash. In the case of induction furnaces, the larger amount of molten metal 30 can cause an explosion when combined with water in the water jacket of the furnace, due to eating away of the furnace lining. Hence, the furnace 10 according to the present invention can be used to melt any kind of mineral powders besides coal-ash.

In order that fibers be made to predetermined specification, additives 32 may be introduced at a predetermined rate into the vat 14 via the additive chute 18. The additives will make contact with the molten metal 30 and thereupon melt, spreading across the surface of the metal and mixing with the melted coal-ash to form a melt 42 (the melt 42 being composed of only melted coal-ash when no additive is present).

As indicated above, the spout 20 is structured so that molten metal 30 enters into a deepened section 36. This assures that the melt 42 will be of a predetermined fluidity at the pour spout section 38. Further, the spout serves as a weir, in that the metal 30 is prevented from flowing out the pour spout section, but the melt 42 which floats on the metal is permitted to exit the vat 32 through the pour spout section 38. Only melt 42 can exit via the pour spout section 38 because the dam 39 is positioned relative to the pour spout section so as to prevent any unmelted coal-ash and/or additives, which float upon the melt, from exiting the furnace.

The predetermined rate of entry of coal-ash and additives is determined by the desired flow rate of the melt 42 out the pour spout section 38. Depending upon the conventional spinner stage used, the flow rate may be adjusted to assure best quality fiber production. The flow rate of the mix 42 may be changed by adjusting the rate of entry of coal-ash and additives into the vat, as well as adjusting the electrical current into the furnace and, also, by adjusting the tilt of the furnace via a conventional tilting mechanism 44.

As an example of a conventional spinner stage 22 that is well known in the art, FIG. 1 shows melt 42 exiting the pour spout section 38 and falling onto a series of rotating drums 46. An air stream 48 blows the melt 42 off the drums and as this occurs the melt coalesces into long, thin fibers which are then collected at a collection chamber 50. Such systems are manufactured by Jungers Verkstads AB, Gothenburg, Sweden.

Figure 3:
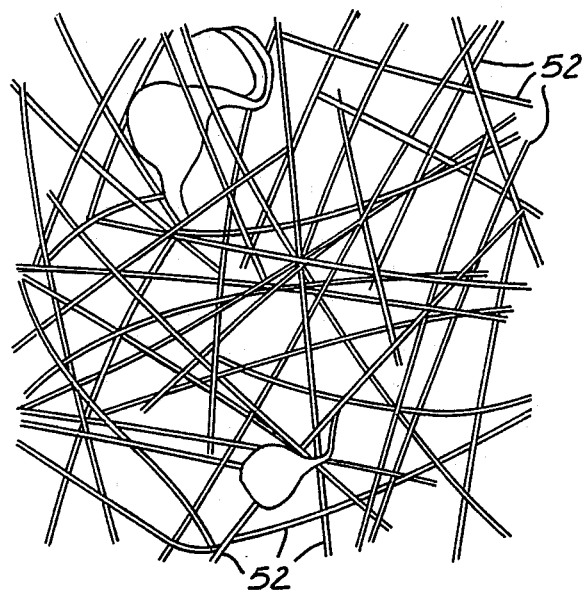
FIG. 3 is a detail side view of mineral wool fibers made from coal-ash according to the apparatus of the present invention.

As an example of operation, the inventors performed the following test. A one ton direct arc furnace was used that was modified to provide a shallow vat for molten metal in the form of pig iron. The pig iron was maintained by the electric arc at 2,500 to 3,000 degrees Fahrenheit, an important temperature in order for the coal-ash to achieve proper consistency when it melts. Coal-ash was added and it spread across the surface of the molten pig iron. Next the additives were added between the carbon electrodes, which then mixed with the molten coal-ash. The proximity of the electrodes caused the mixture of coal-ash and additives to superheat. The molten mix (or melt) then exited out the spout depending upon the rate of coal-ash/additive entry, the electric current, and the tilt of the furnace. The mineral wool fibers 52 made from the foregoing test are shown in FIG. 3. These fibers 52 are of extremely attractive quality because of their uniformity and very high melting temperature (around 2,000 degrees Fahrenheit.

To those skilled in the art to which this invention appertains, the above described preferred embodiment may be subject to change or modification. For example, coal-ash and additives may be pre-mixed and then introduced into the vat via chute 16, chute 18, or both chutes 16 and 18. Such change or modification can be carried out without departing from the scope of the invention, which is intended to be limited only by the scope of the appended claims.

What is Claimed is:

1. An apparatus for providing molten material from solid material, said apparatus comprising:
    an electric arc furnace, the electric arc furnace providing a vat;
    a quantity of liquefied metal contained in said vat;
    entry means connected with said electric arc furnace for introducing solid material into said vat at a selectable rate;
    heating means connected with said electric arc furnace for providing heating of said liquefied metal so that said solid material is converted to a melt floating on said liquefied metal at a selected rate; and
    spout means connected with said electric arc furnace for selectively exiting said melt from said furnace, said spout means comprising:
        a deepened section connected with said electric arc furnace, said deepened section being at least partially filled with said liquefied metal;
        a spout section connected with said deepened section, said spout section being structured to provide a pouring spout for said melt so that said melt may selectively exit said electric arc furnace, said deepened section and said spout section being structured to prevent said liquefied metal from exiting said electric arc furnace; and
        a dam connected with said electric arc furnace adjacent said spout section, said dam being structured to prevent said solid material which has not been converted to melt from exiting said electric arc furnace.

2. The apparatus of claim 1, further comprising spinner stage means for producing mineral wool fibers from said melt after said melt exits said spout means.

3. The apparatus of claim 1, wherein said quantity of liquefied metal fills said vat to a shallow depth.

4. A method for providing mineral wool fibers from coal-ash, comprising the steps of:
    providing an electric arc furnace having a vat;
    providing a quantity of metal in said vat;
    supplying electrical energy to said electric arc furnace so as to liquefy the metal;
    introducing mineral material into said vat, said mineral material comprising coal-ash, said mineral material becoming at least in part molten on the liquefied metal;
    simultaneously selectively heating and selectively skimming the mineral material so that only the molten portion thereof exits said vat at a selected rate; and
    spinning said molten portion of said mineral material so as to form a plurality of wool-like mineral fibers.

5. The method of claim 4, wherein said step of introducing further introduces at least one additive into said vat.

6. The apparatus of claim 3, wherein said solid material comprises coal-ash and at least one additive, further wherein said entry means comprises a first entry means for said coal-ash, said first entry means being located in said electric arc furnace at a location remote from said spout means; and wherein said entry means further comprises a second entry means for said at least one additive, said second entry means being located in said electric arc furnace adjacent said heating means.

7. The apparatus of claim 6, wherein said heating means comprises three electrodes arranged in a delta shape; said second entry means being located centrally with respect to said delta shape.

8. The apparatus of claim 7, further comprising spinner stage means for producing mineral wool fibers from said melt after said melt exits said spout means.

9. An apparatus for providing molten mineral material, said molten mineral material being provided for delivery to a spinner apparatus where said molten mineral material is converted into mineral wool fibers, said apparatus comprising:
    an electric arc furnace, the electric arc furnace providing a vat;
    a quantity of liquefied metal contained in said vat, said liquefied metal filling said vat to a shallow depth;
    entry means connected with said electric arc furnace for introducing mineral material into said vat at a selectable rate, the mineral material comprising coal-ash;
    heating means connected with said electric arc furnace for providing heating of said liquefied metal so that the mineral material is converted to a melt floating on said liquefied metal at a selected rate; and
    spout means connected with said electric arc furnace for selectively exiting said melt from said furnace, said spout means comprising:
        a deepened section connected with said electric arc furnace, said deepened section being at least partially filled with said liquefied metal;
        a spout section connected with said deepened section, said spout section being structured to provide a pouring spout for said melt so that said melt may selectively exit said electric arc furnace to the spinner apparatus, said deepened section and said spout section being structured to prevent said liquefied metal from exiting said electric arc furnace; and
        a dam connected with said electric arc furnace adjacent said spout section, said dam being structured to prevent said mineral material which has not been converted to melt from exiting said electric arc furnace.

10. The apparatus of claim 9, further comprising spinner stage means for producing mineral wool fibers from said melt after said melt exits said spout means.

11. The method of claim 5, wherein said step of simultaneously heating and skimming comprises:
    selectively providing heat to said mineral material;
    selectively permitting the molten portion of said mineral material to exit said electric arc furnace;
    blocking the liquefied metal from exiting said electric arc furnace; and
    blocking that portion of the mineral material which is not molten from exiting the electric arc furnace.

12. The apparatus of claim 10, wherein said solid material comprises coal-ash and at least one additive, further wherein said entry means comprises a first entry means for said coal-ash, said first entry means being located in said electric arc furnace at a location remote from said spout means; and wherein said entry means further comprises a second entry means for said at least one additive, said second entry means being located in said electric arc furnace adjacent said heating means.

13. The apparatus of claim 12, wherein said heating means comprises three electrodes arranged in a delta shape; said second entry means being located centrally with respect to said delta shape.

14. A method for providing molten material for use in the production of mineral wool fibers, comprising the steps of:

provided an electric arc furnace having a vat;
providing a predetermined quantity of metal in said vat;
supplying electrical energy to said electric arc furnace so as to liquefy the metal;
introducing mineral material into said vat, said mineral material becoming at least in part molten upon the liquefied metal; and
simultaneously selectively heating and selectively skimming the mineral material so that only the molten portion thereof exits said vat at a selected rate.

15. The method of claim 14, wherein said step of introducing introduces coal-ash into said vat.

16. The method of claim 15, wherein said step of introducing further introduces at least one additive into said vat.

17. The method of claim 16, wherein said step of simultaneously heating and skimming comprises:

selectively providing heat to said mineral material;
selectively permitting the molten portion of said mineral material to exit said electric arc furnace;
blocking the liquefied metal from exiting said electric arc furnace; and
blocking that portion of the mineral material which is not molten from exiting the electric arc furnace.

* * * * *